United States Patent
Cruz

(10) Patent No.: US 10,650,696 B2
(45) Date of Patent: May 12, 2020

(54) SYSTEMS AND METHODS FOR RECOGNIZING MUSICAL INSTRUMENTS AND PROVIDING BLIND ASSISTIVE TUNING AND ORIENTING OF MUSICAL INSTRUMENTS

(71) Applicant: Toyota Motor Engineering & Manufacturing North America, Inc., Erlanger, KY (US)

(72) Inventor: Carlo Cruz, Cincinnati, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 383 days.

(21) Appl. No.: 15/260,533

(22) Filed: Sep. 9, 2016

(65) Prior Publication Data

US 2018/0075771 A1  Mar. 15, 2018

(51) Int. Cl.
*G09B 15/04* (2006.01)
*G09B 15/00* (2006.01)
*G09B 21/00* (2006.01)
*G10H 1/00* (2006.01)
*G10H 1/44* (2006.01)

(52) U.S. Cl.
CPC ........... *G09B 15/00* (2013.01); *G09B 21/001* (2013.01); *G10H 1/0016* (2013.01); *G10H 1/44* (2013.01); *G10H 2210/066* (2013.01); *G10H 2210/091* (2013.01); *G10H 2220/311* (2013.01); *G10H 2220/455* (2013.01)

(58) Field of Classification Search
CPC .... G09B 15/00; G09B 21/001; G10H 1/0016; G10H 1/44; G10H 2210/066; G10H 2210/091; G10H 2220/311; G10H 2220/455

USPC ........................................................ 84/470 R
See application file for complete search history.

(56) References Cited

U.S. PATENT DOCUMENTS

| 3,831,296 | A   | 8/1974 | Hagle |
| 4,022,097 | A   | 5/1977 | Strangio |
| 5,489,112 | A   | 1/1996 | Troudet et al. |
| 9,262,940 | B2* | 2/2016 | Farber .................... G09B 15/04 |

(Continued)

OTHER PUBLICATIONS

Meinhold, "Vibrating Glove Teaches the Piano, Helps People with Spinal-Cord Injuries", Jul. 25, 2012, http://www.ecouterre.com/vibrating-glove-teaches-the-piano-helps-people-with-spinal-cord-injuries/.

*Primary Examiner* — Jianchun Qin
(74) *Attorney, Agent, or Firm* — Dinsmore & Shohl LLP

(57) ABSTRACT

Systems and methods of orienting a vision impaired user with a musical instrument and systems and methods of directing the vision impaired user to tune the musical instrument are disclosed. A method of orienting includes directing the user to play a note on the musical instrument, determining the note and a corresponding location on the musical instrument, the corresponding location being a portion of the musical instrument that generates the note, determining a difference between the corresponding location and a target location, the target location representing at least a portion of a positioning necessary for the user to play the musical instrument, generating one or more non-visual directions based on the difference, and providing the one or more non-visual directions to the user. The one or more non-visual directions direct the user to the target location.

20 Claims, 6 Drawing Sheets

(56) References Cited

U.S. PATENT DOCUMENTS

| | | |
|---|---|---|
| 2007/0166693 A1 | 7/2007 | Blas et al. |
| 2014/0242554 A1 | 8/2014 | Mostafa |
| 2014/0260898 A1* | 9/2014 | Bales .................. G09B 15/026 |
| | | 84/433 |
| 2014/0267645 A1* | 9/2014 | Wexler ................ G09B 21/006 |
| | | 348/62 |
| 2015/0310762 A1 | 10/2015 | Seim et al. |

* cited by examiner

SYSTEMS AND METHODS FOR RECOGNIZING MUSICAL INSTRUMENTS AND PROVIDING BLIND ASSISTIVE TUNING AND ORIENTING OF MUSICAL INSTRUMENTS

TECHNICAL FIELD

The present specification generally relates blind assistive systems and methods for blind for visually impaired users and, more specifically, to systems and methods for recognizing a musical instrument and providing visually impaired users with instructions for tuning and/or playing the musical instrument.

BACKGROUND

Blind and vision impaired persons currently have limited options with respect to guidance for holding a musical instrument, orienting a musical instrument in a correct manner, tuning a musical instrument, and/or the like. More specifically, blind and vision impaired persons have to rely on another person to tell them whether they are appropriately holding and/or oriented with a particular musical instrument, or rely on their other senses, such as touch and hearing. For instruments where several components feel the same and may have very similar sounds (e.g., a piano or the like), this can be increasingly difficult. In addition, many devices used to tune an instrument provide a visual indicator as to whether a node generated by the instrument is flat or sharp, which cannot be adequately used by blind and vision impaired persons.

Accordingly, a need exists for systems and methods that provide guidance a vision impaired person to appropriately direct the person to the musical instrument, orient the person with the musical instrument, and/or tune the musical instrument.

SUMMARY

In one embodiment, a method of orienting a vision impaired user with a musical instrument includes directing, by a processing device, the user to play a note on the musical instrument and determining, by the processing device, the note played by the user and a corresponding location on the musical instrument. The corresponding location is a portion of the musical instrument that generates the note. The method further includes determining, by the processing device, a difference between the corresponding location and a target location. The target location represents at least a portion of a user positioning for playing the musical instrument. The method further includes generating, by the processing device, one or more non-visual directions based on the difference and providing, by the processing device, the one or more non-visual directions to the user. The one or more non-visual directions direct the user to the target location.

In another embodiment, a method of guiding a vision impaired user to tune a string musical instrument includes directing, by the processing device, the user to play each of a plurality of strings on the string musical instrument, determining, by the processing device, a first one of the plurality of strings that is improperly tuned, determining, by the processing device, a difference between an improper tuning of the first one of the plurality of strings and a proper tuning of the first one of the plurality of strings, generating, by the processing device, one or more non-visual directions based on the difference, and providing, by the processing device, the one or more non-visual directions to the user. The one or more non-visual directions direct the user to tune the first one of the plurality of strings.

In yet another embodiment, a system for orienting a vision impaired user with a musical instrument includes a processing device and a non-transitory, processor-readable storage medium. The non-transitory, processor-readable storage medium comprises one or more programming instructions that, when executed, cause the processing device to direct the user to play a note on the musical instrument and determine the note played by the user and a corresponding location on the musical instrument. The corresponding location is a portion of the musical instrument that generates the note. The non-transitory, processor-readable storage medium further comprises one or more programming instructions that, when executed, cause the processing device to determine a difference between the corresponding location and a target location. The target location represents at least a portion of a positioning necessary for playing the musical instrument. The non-transitory, processor-readable storage medium further comprises one or more programming instructions that, when executed, cause the processing device to generate one or more non-visual directions based on the difference and provide the one or more non-visual directions to the user. The one or more non-visual directions direct the user to the target location.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are generally directed to devices, systems, and methods that direct a vision impaired user toward a musical instrument, orient the vision impaired user with the musical instrument, and/or direct the vision impaired user to tune the musical instrument. The devices, systems, and methods described herein may be embodied within a device that is worn by the vision impaired user and contain one or more components that are used for sensing the location of the vision impaired user and/or the user's environment, making one or more determinations with respect to musical instruments that are detected from the sensing, providing instructions to the user, and monitoring the user's responses to the instructions. It should be understood that the user is not required to be a vision impaired person; rather, the user includes any individual that uses the vision assist device, regardless of disability.

Figure 1:
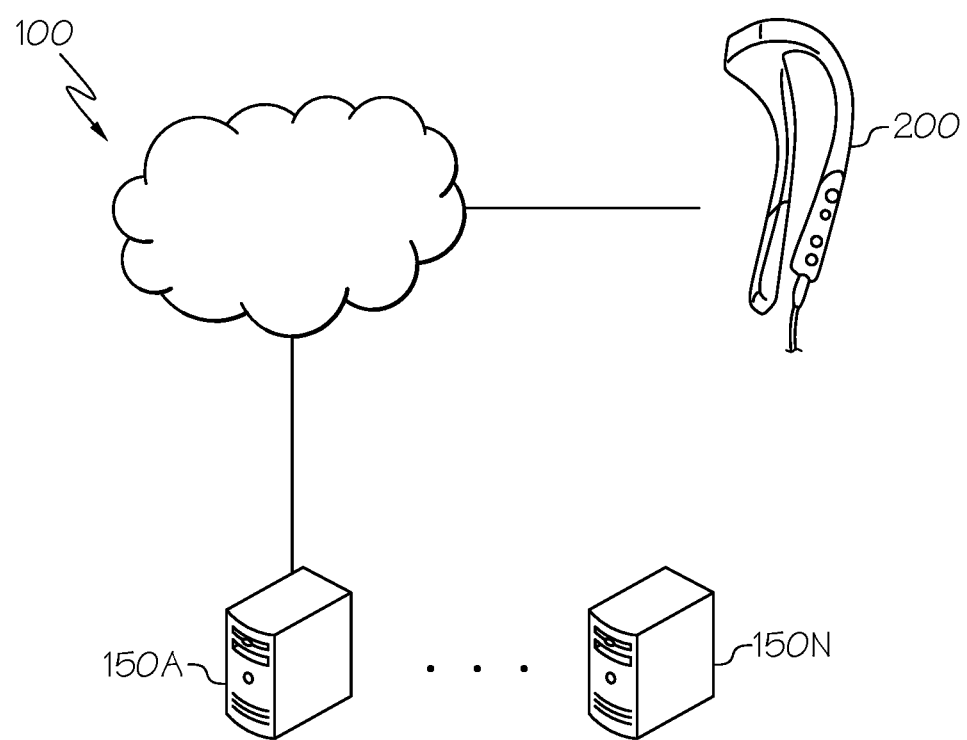
FIG. 1 schematically depicts an illustrative network that includes a vision assist device for recognizing, orienting, and tuning the musical instruments for a vision impaired user, according to one or more embodiments shown and described herein.

FIG. 1 depicts an illustrative network that includes a system for recognizing, orienting, and tuning the musical instruments for a vision impaired person, according to embodiments shown and described herein. As illustrated in FIG. 1, a network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The network 100 may generally be configured to electronically connect one or more devices (e.g., one or more computing devices) and/or components thereof with a vision assist device 200. Illustrative devices may include, but are not limited to, one or more server computing devices 150a . . . 150n and a vision assist device 200.

The server computing devices 150a . . . 150n may receive electronic data and/or the like from the vision assist device 200, may assist with operation of the vision assist device 200, may store and/or access musical instrument related data, may store and/or access tuning data, and/or the like.

It should be understood that while the server computing devices 150a . . . 150n are depicted as servers, these are nonlimiting examples. More specifically, any type of computing device (e.g., mobile computing device, personal computer, server, laptop, tablet, mobile phone, etc.) may be used for any of these components. Additionally, while each of these server computing devices 150a . . . 150n is illustrated in FIG. 1 as a single piece of hardware, this is also merely an example. More specifically, each of the server computing devices 150a . . . 150n may represent a plurality of computers, servers, databases, components, and/or the like.

The vision assist device 200 is used to perform one or more user-facing functions, such as sensing and monitoring the user and/or the user's environment, receiving inputs from the user, providing directions to the user, and/or the like. Additionally, the vision assist device 200 may act as an interface between the user and one or more components connected to the network 100, such as the server computing devices 150a . . . 150n. The vision assist device 200 may also be used to input additional data into a data storage portion of the server computing devices 150a . . . 150n. For example, the vision assist device 200 may receive inputs from a user that relate to user preferences, and may input such user preferences as the additional data. In addition, the vision assist device 200 may be a user-worn device (e.g., a device worn around the user's neck, in the user's ear, and/or the like), a device that is carried by the user, a free standing device that can be coupled to an object such as a musical instrument, or the like.

While a single vision assist device 200 is depicted herein, the number of vision assist devices is not limited by this disclosure and may generally be any number of vision assist devices. For example, a plurality of vision assist devices may be networked together to collectively sense and individually provide directions to their respective users (e.g., a plurality of vision assist devices 200 may be used to direct an entire band of vision impaired users).

In addition, it should be understood that while the embodiments depicted herein refer to a network of devices, the present disclosure is not solely limited to such a network. In some embodiments, the various processes described herein may be completed by a single non-networked vision assist device 200.

Figure 2A:
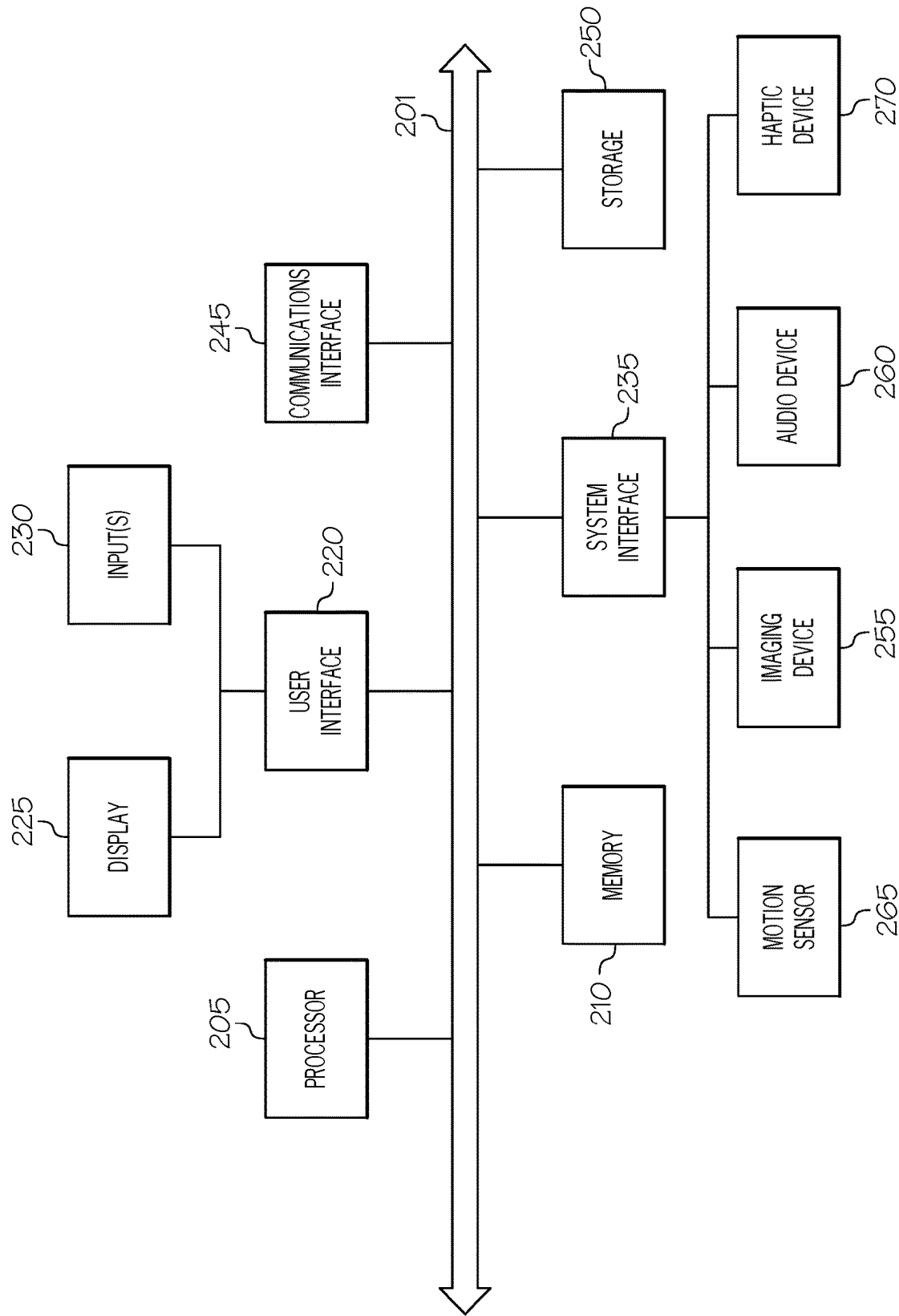
FIG. 2A schematically depicts a block diagram of illustrative hardware of a vision assist device according to one or more embodiments shown and described herein.

FIG. 2A schematically depicts a block diagram of illustrative hardware of a vision assist device 200 according to one or more embodiments shown and described herein. A bus 201 may interconnect the various components. A processing device 205, such as a computer processing unit (CPU), may be the central processing unit of the vision assist device 200 (FIG. 1), performing calculations and logic operations to execute a program. The processing device 205, alone or in conjunction with one or more of the other elements, is an illustrative processing device, computing device, processor, or combination thereof. Memory 210, such as read only memory (ROM) and/or random access memory (RAM), may constitute an illustrative memory device and/or a non-transitory processor-readable storage medium. The memory 210 may include one or more programming instructions thereon that, when executed by the processing device 205, cause the processing device 205 to complete various processes, such as the processes described herein. In some embodiments, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media. Similarly, the programming instructions stored on the memory 210 may be embodied as a plurality of software logic modules, where each logic module provides programming instructions for completing one or more tasks, as described in greater detail hereinbelow with respect to FIG. 2B.

Still referring to FIG. 2A, a storage device 250, which may generally be a storage medium may contain one or more data repositories for storing data that is used for imaging, evaluating, identifying, and tuning a musical instrument. The storage device 250 may be any physical storage medium, including, but not limited to, a hard disk drive (HDD), memory, removable storage, and/or the like. While the storage device 250 is depicted as a local device, it should be understood that the storage device 250 may be a remote storage device, such as, for example, a server computing device or the like (e.g., one or more server computing devices 150a . . . 150n depicted with respect to FIG. 1). Illustrative data that may be contained within the storage device 250 is described hereinbelow with respect to FIG. 2C.

Still referring to FIG. 2A, a user interface 220 may communicate information from the bus 201 to be displayed on a display 225 portion of the computing device in non-visual formats (e.g., audio formats, haptic formats, and/or the like). Moreover, the user interface 220 may also include one or more inputs 230 that allow for transmission to and receipt of data from input devices such as a keyboard, a mouse, a joystick, a touch screen (e.g., a graphic user interface (GUI)), a remote control, a pointing device, a video input device, an audio input device, a haptic feedback device, and/or the like. Such a user interface 220 may be used, for example, to allow a user to interact with the vision assist device 200 (FIG. 1) or any component thereof.

A system interface 235 may generally cause the vision assist device 200 (FIG. 1) to interface with one or more sensing components, such as, for example, an imaging device 255, an audio device 260, a motion sensor 265, and/or a haptic device 270, which may or may not be integrated into the vision assist device 200. Communication with such components may occur using various communications ports (not shown). An illustrative communications port may be attached to a communications network, such as the Internet, an intranet, a local network, a direct connection, and/or the like. The imaging device 255 may generally be an imaging device that is now known or later developed, including a video camera, a still image camera, an infrared (IR) sensor, and/or the like. Accordingly, the imaging device 255 may be configured to scan and/or capture an image an area surrounding the vision assist device 200 (FIG. 1) and/or a user thereof and provide the imaged area as image data that can be used for determining a user location, determining an instrument and/or instrument location, determining a relative positioning of a user with respect to an instrument, and/or other functionality described herein. The audio device 260 may generally include any device now known or later developed that senses sound and provides sound data that corresponds to the sensed sound (e.g., a microphone) and/or provides sound signals based on received sound data (e.g., a speaker). In some embodiments, the audio device 260 may be separate devices for sensing and providing sound (e.g., separate microphone and speaker devices). The motion sensor 265 may generally include any device that senses movement of the vision assist device 200 (FIG. 1), such as, for example, an infrared sensor, an optics sensor, a radio frequency energy sensor, a sound sensor, a movement/vibration sensor (e.g., a gyroscope, an accelerometer, and/or the like), a magnetism sensor, and/or the like, that provides movement data of the user. The haptic device 270 may generally include devices that provide haptic outputs that can be sensed by a user of the vision assist device 200 (FIG. 1), such as a vibration motor, a tactile electronic device, a heat producing device, and/or the like. While the imaging device 255, the audio device 260, the motion sensor 265, and the haptic device 270 are depicted herein as being separate devices, it should be understood that in some embodiments, a single device may encompass the functionality of two or more of the devices described herein. For example, a single device may provide the functionality of both the imaging device 255 and the motion sensor 265.

A communications interface 245 may generally cause the vision assist device 200 to interface with one or more external components, such as, for example, an external computing device, a remote server, and/or the like. Communication with external devices may occur using various communications ports (not shown). An illustrative communications port may be attached to a communications network, such as the Internet, an intranet, a local network, a direct connection, and/or the like.

Figure 2B:
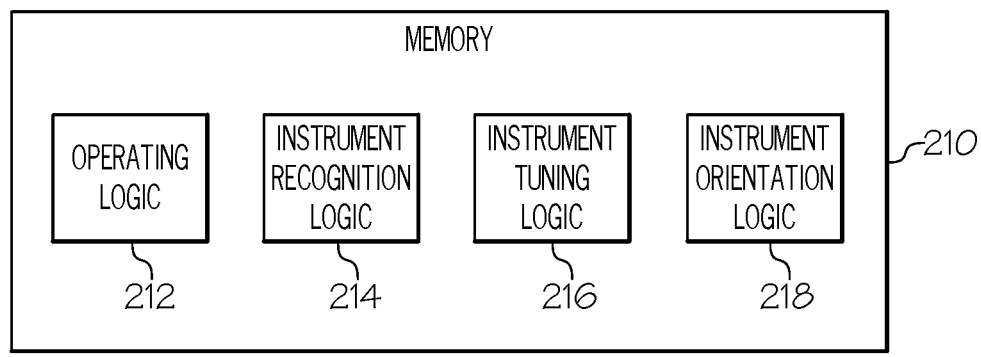
FIG. 2B schematically depicts a block diagram of software logic modules contained within a memory of a vision assist device according to one or more embodiments shown and described herein.

Referring now to FIG. 2B, the memory 210 may contain operating logic 212, instrument recognition logic 214, instrument tuning logic 216, and/or instrument orientation logic 218. The operating logic 212 may include an operating system and/or other software for managing components of the vision assist device 200 (FIG. 1). The instrument recognition logic 214 may include one or more software modules for obtaining image data and/or audio data of an area surrounding the vision assist device 200 (FIG. 1) and/or the user thereof. The instrument recognition logic 214 may also be configured for analyzing the image data and/or the audio data to determine if a musical instrument is present, determining the type of musical instrument, and directing the user to the musical instrument. In some embodiments, the instrument recognition logic 214 may include at least a portion of a musical instrument software module, as described herein.

In some embodiments, instrument tuning logic 216 may be configured for obtaining image data and/or audio data of a musical instrument and/or one or more components thereof (e.g., a particular string of a stringed instrument or a particular key of a keyed instrument). The instrument tuning logic 216 may also be configured for, determining an expected tone of the sound produced by the musical instrument or component thereof, comparing a sensed tone of the sound produced by the musical instrument or component thereof with the expected tone, and determining whether a tuning adjustment is necessary. In some embodiments, the instrument tuning logic 216 may be configured for providing instructions for tuning the musical instrument or component thereof. In some embodiments, the instrument tuning logic 216 may include a string tuning module, as described herein.

The instrument orientation logic 218 may include one or more software modules that operate in a similar manner to and/or in conjunction with the one or software modules contained within the instrument recognition logic 214. As such, the instrument orientation logic 218 may also include one or more software modules that obtain image data and/or audio data of an area surrounding the vision assist device 200 (FIG. 1), analyze the data to determine the positioning of the musical instrument with respect to the user, and provide directions to the user for the purposes of orienting the user with the musical instrument. In some embodiments, the instrument orientation logic 218 may be configured to receive one or more inputs from the user, such as inputs that relate to a user's preferences (e.g., preferred finger placement, etc.). In some embodiments, the instrument orientation logic 218 may include at least a portion of a musical instrument software module, as described herein.

Figure 2C:
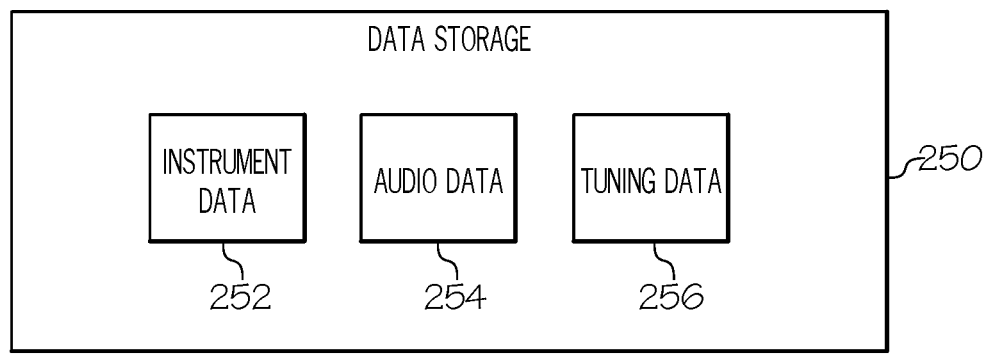
FIG. 2C schematically depicts a block diagram of various data contained within a data storage component of a vision assist device according to one or more embodiments shown and described herein.

As shown in FIG. 2C, the storage device 250 may store instrument data 252, audio data 254, tuning data 256, and/or other data. Instrument data 252 may include data relating to musical instruments that can be used in visual identification of a musical instrument, a location of a particular component of the musical instrument (e.g., a particular key on a keyboard), and/or the like. An illustrative example of instrument data 252 may include one or more sample images of a musical instrument.

Audio data 254 may include, for example, data relating to musical instruments that can be used in audio identification of a musical instrument, particularly a component thereof (e.g., a particular key on a keyboard). An illustrative example of audio data 254 may include data relating to one or more particular tones that are emitted by an exemplary musical instrument or component thereof (e.g., sound clips).

Tuning data 256 may be similar to the audio data 254, but may further be used for determining whether a particular note played by a musical instrument is sharp or flat. That is, additional sample tones that may be contained within the audio data 254 may further be appended with information as to whether such tones are sharp or flat to aid in a determination as to whether a particular tone played by the musical instrument is sharp or flat and in need of tuning. The tuning data 256 may further include data relating to instructions for tuning a particular musical instrument to a designated standard tuning, such as, for example, instructions for twisting a tuning head, instructions for moving a capo, and/or the like.

It should be understood that the components illustrated in FIGS. 2A-2C are merely illustrative and are not intended to limit the scope of this disclosure. More specifically, while the components in FIGS. 2A-2C are illustrated as residing within the vision assist device 200 (FIG. 1), this is a nonlimiting example. In some embodiments, one or more of the components may reside with the one or more server computing devices 150a . . . 150n and/or external to the vision assist device 200 and/or server computing devices 150a . . . 150n (FIG. 1). Similarly, one or more of the components may be embodied in other electronic or computing devices not specifically described herein.

Figure 3:
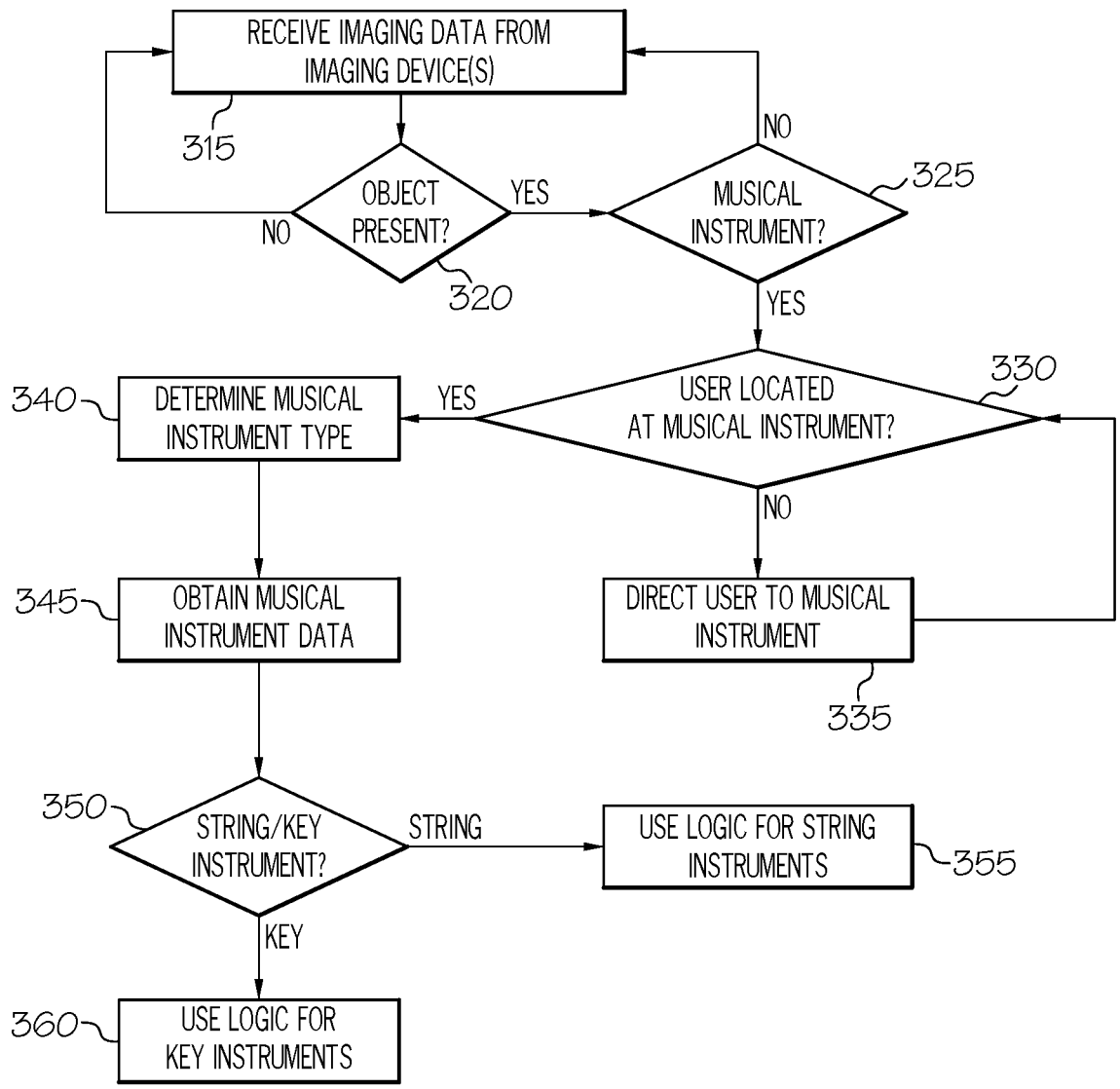
FIG. 3 depicts a flow diagram of an illustrative method executing a musical instrument module that recognizes a musical instrument and directs a user thereto according to one or more embodiments shown and described herein.

FIG. 3 depicts a flow diagram of an illustrative method of recognizing a musical instrument and directing a user thereto according to one or more embodiments shown and described herein. While also referring to FIGS. 1 and 2A-2C, at least a portion of the logic (e.g., the operating logic 212, the instrument recognition logic 214, and/or the instrument orientation logic 218) contained within the memory 210 may be used for executing the processes described with respect to FIG. 3. At block 315, imaging data may be received from the imaging device 255.

A determination may be made at block 320 as to whether an object is present in the imaging data. If an object is not present (e.g., no objects are within focus, no objects are present in the imaged area of the imaging device 255, etc.), the process may return to block 320. If an object is present, a determination may be made at block 325 as to whether the object is a musical instrument. That is, the vision assist device 200 may access instrument data from one or more databases and determine whether the received imaging data matches a reference image from the instrument data.

If it is determined that the object is not a musical instrument, the process may return to block 315. If the object is determined to be a musical instrument, a determination may be made at block 330 as to whether the user is located at the musical instrument. That is, the determination may be made as to whether the user is located at the musical instrument or adequately positioned with respect to the musical instrument such that the user can manipulate and play the musical instrument. If the user is not adequately positioned (e.g, not located at the musical instrument, the vision assist device 200 may direct the user to the musical instrument at block 335. Directing the user to the musical instrument may generally include providing one or more movement directions to the user, sensing the user's movements in response to the movement directions, and providing additional movement directions until the user is adequately positioned with respect to the musical instrument. Providing one or more movement directions may include, for example, providing one or more sound instructions that are emitted from the audio device 260, providing haptic feedback that is emitted by haptic device 270, and/or the like. For example, the vision assist device 200 may emit a tone or other audible instruction such as "turn right" or "extend your left hand" as the one or more sound instructions, and/or may vibrate on one or more sides to indicate that the user is to turn, stop, grasp, and/or the like.

At block 340, the musical instrument type may be determined. That is, the vision assist device 200 may determine whether the instrument is a string instrument, including the type of string instrument (e.g., a guitar, a violin, a harp, or the like), a key or keyboard instrument, including the type of key instrument (e.g., an organ, an accordion, a dulcitone, or the like), a string instrument having a keyboard, including the type of instrument (e.g., a piano, a harpsichord, or the like), a valve or slide instrument, including the type of valve/slide instrument (e.g., a trombone, a tuba, a trumpet, or the like), a woodwind instrument, including the type of woodwind instrument (e.g., a flute, an oboe, a saxophone, or the like), a percussion instrument, including the type of percussion instrument (e.g., a snare drum, a bass drum, a tambourine, cymbals, or the like), and/or other instrument. In some embodiments, determining the musical instrument type may be completed only if requested by the user (e.g., via a user input). Determining the type of musical instrument may include accessing stored instrument data (e.g., stored image data) and/or audio data for exemplary instruments, obtaining imaging data and/or sound data corresponding to the instrument at which the user is located, and comparing the data to determine whether stored instrument data matches the imaging data and/or sound data. In some embodiments, the musical instrument type may be determined at block 340 by receiving an input from a user, where the input corresponds to the type of musical instrument.

For example, the user may voice, in response to a query provided by the vision assist device 200, that the instrument is supposed to be a particular instrument. Since the user may not be able to clearly see the musical instrument (i.e., because the user is vision impaired), the vision assist device 200 may verify the user inputs by obtaining imaging and/or sound data as described hereinabove.

Once the instrument type has been determined, data regarding that particular instrument may be obtained at block 345. The data may generally be obtained from a server, such as the one or more server computing devices 150a . . . 150n. The data contains information about the particular instrument, including image data, sound data, tuning data, and/or the like. The data can be used for the purposes of orienting a user to the instrument and/or tuning the instrument, as described in greater detail herein.

At least one of the operating logic 212, the instrument recognition logic 214, the instrument tuning logic 216 and the instrument orientation logic 218 may be utilized for orienting the user and/or tuning the instrument. For example, a determination may be made at block 350 as to whether the instrument is a string instrument or a key instrument, which may be determined by using the operating logic 212 and/or the instrument recognition logic 214. If the instrument is a string instrument, the vision assist device 200 may use the operating logic 212, the instrument recognition logic 214, the instrument tuning logic 216 and/or the instrument orientation logic 218 as they specifically relate to string instruments at block 355. If the instrument is a key instrument, the vision assist device 200 may use the operating logic 212, the instrument recognition logic 214, the instrument tuning logic 216 and/or the instrument orientation logic 218 as they specifically relate to key instruments at block 360. However, it should be understood that the determination at block 350 may be completed for other types of instruments without departing from the scope of the present disclosure.

Figure 4:
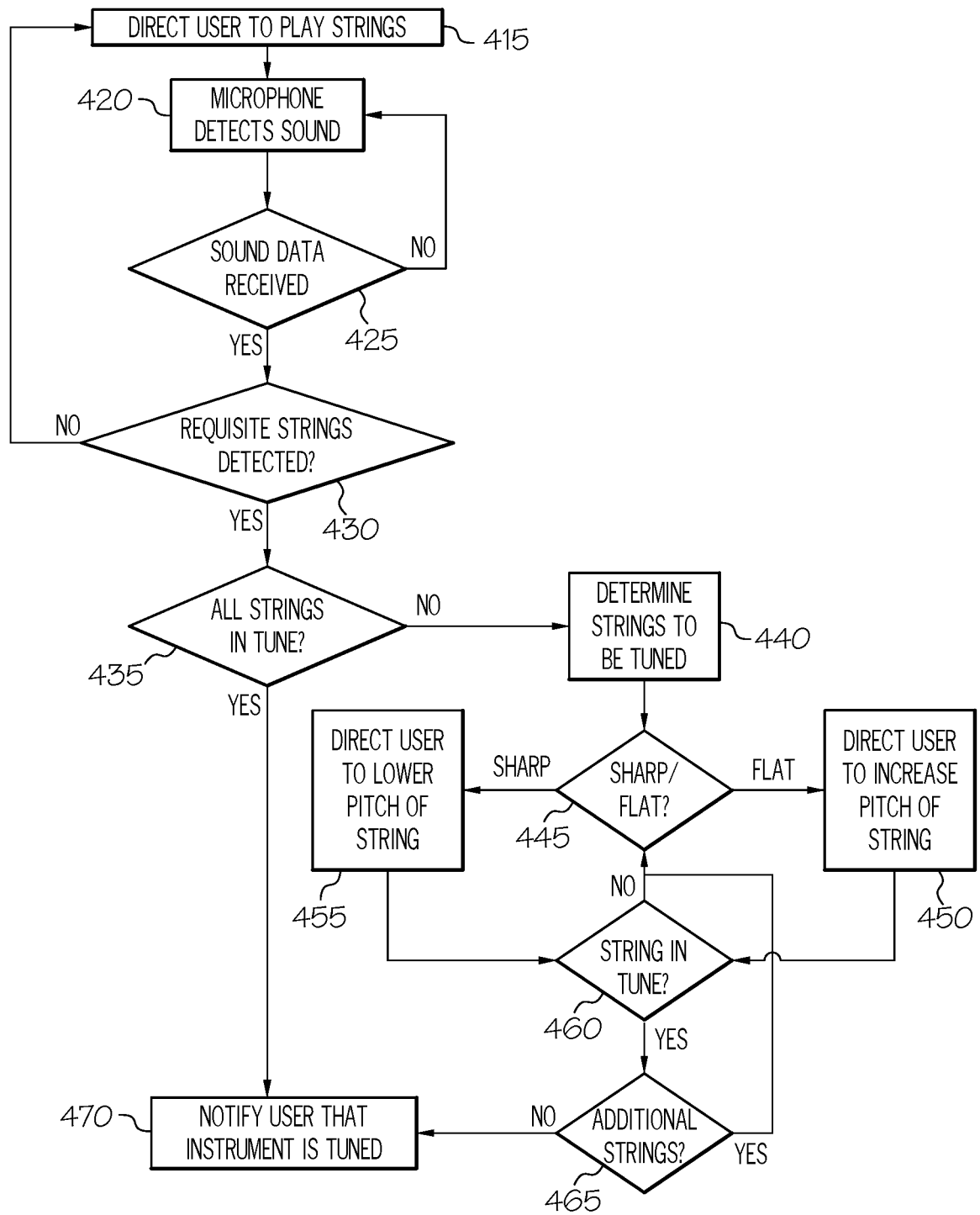
FIG. 4 depicts a flow diagram of an illustrative method of directing a vision impaired user in tuning a musical instrument according to one or more embodiments shown and described herein.

FIG. 4 depicts a flow diagram of an illustrative method of directing a vision impaired user in tuning a musical instrument according to one or more embodiments. While also referring to FIGS. 1 and 2A-2C, the instrument tuning logic 216 may be used to direct the vision impaired user.

The vision assist device 200 may direct the user to play at least one of the strings of the stringed instrument at block 415. The vision assist device 200 may only direct the user to play a single string, a particular portion of the strings, or all of the strings. In general, the sound generated by all strings may be analyzed for turning purposes, but the present disclosure is not limited to such. In some embodiments, the vision assist device 200 may direct the user to play one string at a time until all strings to be tuned are played, play a group of strings until all strings to be tuned are played, or play all strings together. The vision assist device 200 may direct the user on a manner to play the strings by providing audible prompts, haptic feedback, or the like.

The audio device 260 may detect the sounds emitted by the instrument at block 420 once the user plays the instrument to generate the sounds. At block 425, the vision assist device 200 may determine whether sound data has been received from the audio device 260. For example, if the user has not yet played the strings, no sound data may have been received. If no sound data has been received, the process may return to block 420 until sound data is received.

Upon receipt of sound data, a determination may be made as to whether sound from a requisite number of strings from the musical instrument have been detected at block 430, either one string at a time, groups of strings at a time, or all of the stings at once. If sound from the strings has not been detected, the process may return to block 415. If sound from the strings is detected, a determination may be made at block 435 as to whether the strings are in tune. Such a determination may be made by obtaining the tuning data 256 and comparing the tuning data 256 for the corresponding strings with the sensed sound. If all of the strings are in tune, the vision assist device 200 may notify the user that the musical instrument is tuned at block 470. Notification may be an audio notification (e.g., a beep, a tone, an audible statement that all strings are in tune, or the like), a haptic notification, and/or the like.

If at least one string is not in tune, the vision assist device 200 may determine at block 440 which strings are not in tune. Such a determination may be made, for example, by analyzing a pitch of the sound produced by the strings and comparing the pitch with an expected pitch obtained from the tuning data 256. As an example, the vision assist device 200 may determine a difference between an improper tuning of the string and a proper tuning of the string. As such, a determination may be made at block 445 as to whether the pitch of the sound produced by each string is sharp (e.g., higher in pitch than expected) or flat (e.g., lower in pitch than expected). If the string is flat, the vision assist device 200 may generate and provide directions to the user at block 450 to increase the pitch of the sound produced by the string. If the string is sharp, the vision assist device 200 may generate and provide directions the user at block 455 to lower the pitch of the sound produced by the string. Such a increasing and lowering directions may contain specific instructions for the user, including locating the corresponding tuning peg/head/key/pin on the musical instrument (e.g., on the headstock or the like), turning the tuning peg/head/key/pin, how much to turn the tuning peg/head/key/pin, and/or the like to tighten or loosen the respective string on the instrument.

The directions may be provided to the user via voiced commands, emitted tones, haptic feedback, and/or the like. In addition, the vision assist device 200 may sense the user's movements and/or sense a pitch of the tone produced by the tightened or loosened string to determine at block 460 as to whether the string is in tune. In some embodiments, the vision assist device 200 may provide directions to the user to play the sting again or sense the sound that is still resonating from the string. If the string is not in tune, the process may return to block 445. If the string is in tune, the vision assist device 200 may determine at block 465 whether additional strings are out of tune. If so, the process may return to block 445. If no additional strings are out of tune, the process may move to block 470, as described herein.

Figure 5:
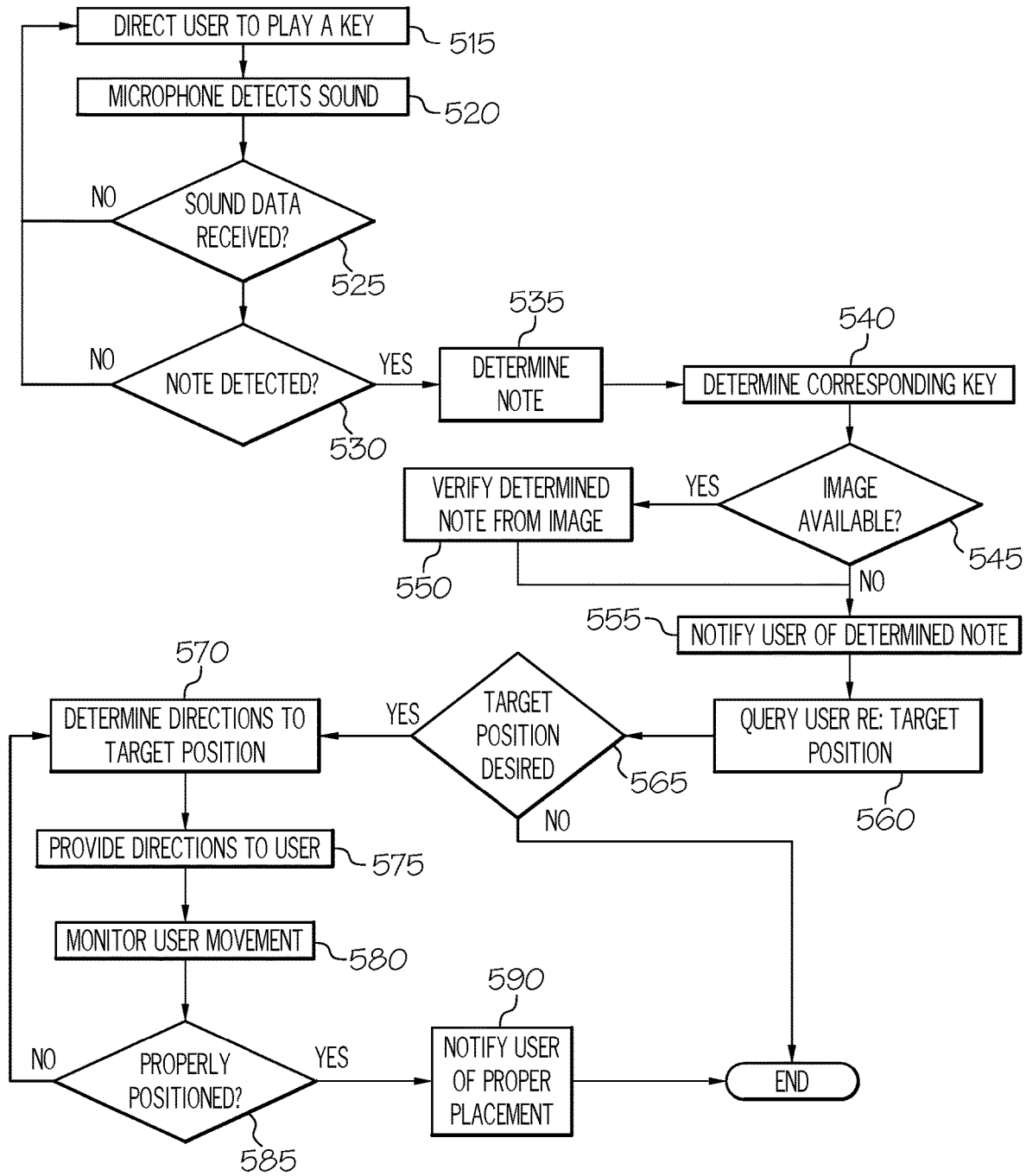
FIG. 5 depicts a flow diagram of an illustrative method of orienting a vision impaired user with a musical instrument according to one or more embodiments shown and described herein.

FIG. 5 depicts a flow diagram of an illustrative method of orienting a vision impaired user with a musical instrument according to one or more embodiments. A user may be oriented with the musical instrument to ensure that the user is able to appropriately play the instrument. That is, the user's hands/fingers must be appropriately placed with respect to the instrument for playing. For example, on a piano, "middle C" refers to a specific pitch of note that is played by a particular key on a standard piano keyboard, and is a key to which pianists may orient their hands/fingers before beginning to play the piano. In another example, a user may orient his fingers on the fret board of the guitar before depressing particular strings for a particular chord. As such, the orienting as described herein refers to guiding a user's hands, fingers, or other body parts to particular locations on the musical instrument so that the user can appropriately play the musical instrument.

The process described herein with respect to FIG. 5 may be completed at any time orientation is desired. For example, the process described herein with respect to FIG. 5 may be completed as soon as the vision assist device 200 determines that the user is located at a musical instrument. In another example, the blocks described herein with respect to FIG. 5 may be completed at any time the user requests such an orientation process (e.g., after playing a first musical piece, but before moving on to a different musical piece that may require different fingering, or if the user becomes disoriented while playing).

FIG. 5 specifically describes orienting a user with respect to a musical instrument having a keyboard. However, it should be understood that the present disclosure is not limited to such. That is, the vision assist device 200 may be used to orient the user to other types of instruments without departing from the scope of the present disclosure. While also referring to FIGS. 1 and 2A-2C, the vision assist device 200 may use the operating logic 212 and/or the instrument orientation logic 218 to orient the user to the musical instrument.

The vision assist device 200 may direct a user to play a note on the musical instrument at block 515. Such a direction may be given via voice prompts, a tone, haptic feedback, or the like, as described in greater detail herein. The user may then play any key on the keyboard, such as, for example, the first key that the user is able to touch.

The audio device 260 may detect the sound emitted by the instrument at block 520 once the user has depressed the key that causes the sound. As such, at block 525, the vision assist device 200 may determine whether sound data has been received from the audio device 260. For example, if the user has not yet pressed a key on the keyboard of the musical instrument, no sound data may have been received. If no sound data has been received, the process may return to block 520 until sound data is received.

Upon receipt of sound data, a determination may be made as to whether a note from the instrument is detected. That is, the vision assist device 200 may ensure that the detected sound is actually a sound produced by the musical instrument, and not ambient noise from an area adjacent to the vision assist device 200. Such a determination may be made by accessing the audio data 254 and/or the tuning data 256 for the particular musical instrument that is being played, comparing the sensed sound to the accessed data, and determining, based on the comparing whether the sensed sound corresponds to the accessed data. If a note is not detected, the process may return to block 515. If a note is detected, the process may proceed to block 535, where the vision assist device 200 determines, from the accessed data, which note was played on the musical instrument. That is, the vision assist device 200 analyzes the sound characteristics of the sensed note (e.g., pitch, frequency, and/or the like) and compares the analyzed sound characteristics with the audio data 254 and/or the tuning data 256 to determine which note is played (e.g., C, G #, E, F, or the like).

At block 540, the vision assist device 200 determines a corresponding location on the musical instrument (e.g., a key on the keyboard) that corresponds to the determined note. That is, the vision assist device 200 accesses the instrument data 252, the audio data 254, and/or the tuning data 256 to obtain the identity and location on the musical instrument (e.g., a particular key) that produces a sound corresponding to the sound characteristics of the determined note.

In various embodiments, the vision assist device 200 may rely on visually obtained data to determine which key the user pressed instead of, or in addition to, the audio data described hereinabove. In one example, the vision assist device 200 may primarily rely on image data and may only refer to audio data when the image data cannot be used (e.g., because the user is blocking the view of the imaging device 255 or the like). In another example, the vision assist device 200 may primarily rely on audio data and may only refer to image data to confirm the determinations that are made with the audio data. In yet another example, the vision assist device 200 may primarily rely on both audio and image data.

Accordingly, at block 545, a determination may be made as to whether an image of the musical instrument (and more particularly, to the specific key that was pressed by the user) is available from the instrument data 252. If an image is available, the image may be used at block 550 to verify the determined note. That is vision assist device 200 may analyze the image data and determine a location of the musical instrument that generated the sound (e.g., the third key from the left end of the keyboard) and compare the determined location with the location that was determined at block 540 to ensure they match. If the locations do not match (e.g., the audio and image data indicated different keys), the vision assist device 200 may restart the entire process depicted in FIG. 5.

If no image data is available or if the determined note is confirmed, the process may proceed to block 555 to notify the user of the note produced by the key that was pressed (e.g., "you pressed the F key" or "you pressed the key that is 4 keys to the left of middle C").

In some embodiments, the user may already be appropriately oriented with the musical instrument or may be able to orient himself/herself without any further guidance. As such, at block 560, the vision assist device 200 may query the user as to whether the user is oriented or whether the user desires to receive instructions for being oriented with the musical instrument. As such, a determination as to whether the user desires to be oriented to a target position is determined at block 565. If no orientation is desired, the process may end.

If orientation is desired, the vision assist device 200 may determine the difference between the user's actual location and the target location and generate the directions that are necessary to move the user (e.g., the user's hands) to the target position at block 570. For example, the vision assist device 200 may recognize that middle C is a white key that is 4 white keys to the left of the key that was pressed by the user, and may also recognize a desired fingering on the piano based on the querying that was completed at block 560. If the desired fingering includes placing the user's first finger on his/her right hand (his/her thumb) on middle C, the vision assist device 200 may determine at block 570 that the user should move his right hand such that the right thumb rests on the white key that is four keys to the right of the key that was pressed, that the right hand index finger should rest on the next white key to the right of middle C (the D key).

Additionally, the vision assist device 200 may instruct the user that the right hand middle finger should be on the next white key to the right (the E key), the right hand ring finger on the next white key to the right (the F key), and the right hand pinky finger rests on the next white key to the right (the G key). The vision assist device 200 may recognize that the proper fingering for the left hand includes placing the left thumb 3 white keys to the left of middle C (the G key), the left hand index finger on the next white key to the left (the F key), the left hand middle finger on the next white key to the left (the E key), the left hand ring finger on the next white key to the left (the D key), and the left hand pinky finger on the next white key to the left (the C key).

At block 575, the generated directions may be provided to the user. The directions may be provided as audio prompts and/or as haptic feedback. Because the user may not be able to visually distinguish between white keys and black keys on the keyboard, a different descriptor may be used. For example, the black keys on a keyboard are generally raised above the white keys, do not extend towards the user as far as the white keys, and are narrower than the white keys. As such, the directions that are provided to the user may describe the white keys as being the wider keys, the lower keys, the keys that extend closer to the user, or the like, such that the user is able to distinguish which keys that are being described.

At block 580, the vision assist device 200 may monitor user movement to ensure the user appropriately follows the directions that were provided. Monitoring may include, for example, analyzing data received from the imaging device 255 to determine the location and positioning of the user's hands and fingers. The vision assist device 200 may determine at block 585 whether the user's hands are appropriately positioned. That is, the vision assist device 200 may determine the actual location of the user's hands and fingers, determine an expected positioning, and compare the actual location with the expected positioning. If the user's hands and fingers are not appropriable positioned, the process may return to block 570. If the user's hands and fingers are appropriately positioned, the vision assist device 200 may notify the user of the proper placement at block 590 and the process may end.

Accordingly, it should now be understood that the systems and methods described herein can automatically recognize a musical instrument, guide a vision impaired user to the musical instrument, orient the user with the musical instrument (e.g., orient the user's hands/fingers with the musical instrument), and/or provide directions to the user for tuning the musical instrument. As such, the systems and methods described herein may provide assistance to a vision impaired user in playing a musical instrument without requiring the vision impaired user to see the musical instrument.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of orienting a vision impaired user with a musical instrument, the method comprising:
    obtaining, by a processing device, image data corresponding to the musical instrument, the image data comprising information pertaining to one or more identifiable features of the musical instrument;
    accessing, by the processing device, stored image data for a plurality of musical instruments;
    identifying, by the processing device, the musical instrument by comparing the one or more identifiable features of the musical instrument with the stored image data;
    determining, by the processing device, a placement of one or more body parts of the user with respect to the musical instrument necessary to correctly play the musical instrument;
    directing, by the processing device, the user to place the one or more body parts to correspond to the determined placement and play a note on the musical instrument;
    determining, by the processing device, the note played by the user and a corresponding location on the musical instrument, wherein the corresponding location is a portion of the musical instrument that generates the note;
    determining, by the processing device, a difference between the corresponding location and a target location, wherein the target location represents at least a portion of a positioning necessary for playing the musical instrument;
    generating, by the processing device, one or more non-visual directions based on the difference; and
    providing, by the processing device, the one or more non-visual directions to the user, wherein the one or more non-visual directions direct the user to adjust the placement of the one or more body parts to correspond to the target location such that the user is oriented with the musical instrument prior to playing music on the musical instrument.

2. The method of claim 1, further comprising, prior to directing the user to play the note:
    determining, by the processing device, that the one or more body parts of the user are not located adjacent to the musical instrument;
    generating, by the processing device, one or more movement directions, wherein the one or more movement directions provide a guidance to the user for moving the one or more body parts adjacent to the musical instrument; and
    providing, by the processing device, the one or more movement directions to the user.

3. The method of claim 1, further comprising, prior to determining the note, receiving, by the processing device, audio data corresponding to the note played by the user.

4. The method of claim 1, further comprising, prior to determining the note, receiving, by the processing device, second image data corresponding to a portion of the instrument that caused the note played by the user.

5. The method of claim 1, further comprising:
    determining, by the processing device, that the user is located at the target location; and
    providing, by the processing device, a notification to the user that the user is located at the target location.

6. The method of claim 1, further comprising:
    determining, by the processing device, that the user is located at an incorrect location that does not correspond to the target location;
    determining, by the processing device, a second difference between the incorrect location and the target location;
    generating, by the processing device, one or more second directions based on the second difference; and
    providing, by the processing device, the one or more second directions to the user, wherein the one or more second directions direct the user to the target location.

7. The method of claim 1, further comprising providing, by the processing device, a notification of one or more of the note and the corresponding location to the user.

8. The method of claim 1, further comprising, prior to determining the difference between the corresponding location and the target location, providing, by the processing device, a query, wherein the query comprises a request for the target location.

9. The method of claim 1, wherein:
    the musical instrument is a keyboard instrument; and
    directing the user to play the note comprises directing the user to strike a key on the keyboard instrument.

10. The method of claim 1, wherein:
    the musical instrument is a string instrument; and
    directing the user to play the note comprises directing the user to strum a string on the string instrument.

11. The method of claim 1, wherein the one or more body parts comprise at least one of a finger and a hand.

12. A system for orienting a vision impaired user with a musical instrument, the system comprising:
    a processing device; and
    a non-transitory, processor-readable storage medium, the non-transitory, processor-readable storage medium comprising one or more programming instructions that, when executed, cause the processing device to perform at least the following:
        obtain image data corresponding to the musical instrument, the image data comprising information pertaining to one or more identifiable features of the musical instrument;
        access stored image data for a plurality of musical instruments;
        identify the musical instrument by comparing the one or more identifiable features of the musical instrument with the stored image data;
        determine a placement of one or more body parts of the user with respect to the musical instrument necessary to correctly play the musical instrument;

direct the user to place the one or more body parts to correspond to the determined placement and play a note on the musical instrument;

determine the note played by the user and a corresponding location on the musical instrument, wherein the corresponding location is a portion of the musical instrument that generates the note;

determine a difference between the corresponding location and a target location, wherein the target location represents at least a portion of a positioning necessary for playing the musical instrument;

generate one or more non-visual directions based on the difference; and provide the one or more non-visual directions to the user, wherein the one or more non-visual directions direct the user to adjust the placement of the one or more body parts to correspond to the target location such that the user is oriented with the musical instrument prior to playing music on the musical instrument.

13. The system of claim 12, wherein the one or more programming instructions, when executed, further cause the processing device to perform at least the following prior to directing the user to play the note:

determine that the one or more body parts of the user are not located adjacent to the musical instrument;

generate one or more movement directions, wherein the one or more movement directions provide a guidance to the user for moving the one or more body parts adjacent to the musical instrument; and provide the one or more movement directions to the user.

14. The system of claim 12, wherein the one or more programming instructions, when executed, further cause the processing device to perform at least the following prior to determining the note:

receive audio data corresponding to the note played by the user.

15. The system of claim 12, wherein the one or more programming instructions, when executed, further cause the processing device to perform at least the following prior to determining the note:

receive second image data corresponding to a portion of the instrument that caused the note played by the user.

16. The system of claim 12, wherein the one or more programming instructions, when executed, further cause the processing device to perform at least the following:

determine that the user is located at the target location; and provide a notification to the user that the user is located at the target location.

17. The system of claim 12, wherein the one or more programming instructions, when executed, further cause the processing device to perform at least the following:

determine that the user is located at an incorrect location that does not correspond to the target location;

determine a second difference between the incorrect location and the target location;

generate one or more second directions based on the second difference; and provide the one or more second directions to the user, wherein the one or more second directions direct the user to the target location.

18. The system of claim 12, wherein the one or more body parts comprise at least one of a finger and a hand.

19. A vision assist device for orienting a vision impaired user with a musical instrument, the vision assist device comprising:

an audio device;

a processing device; and a non-transitory, processor-readable storage medium, the non-transitory, processor-readable storage medium comprising one or more programming instructions that, when executed, cause the processing device to:

obtain image data corresponding to the musical instrument, the image data comprising information pertaining to one or more identifiable features of the musical instrument;

access stored image data for a plurality of musical instruments;

identify the musical instrument by comparing the one or more identifiable features of the musical instrument with the stored image data;

determine a placement of one or more body parts of the user with respect to the musical instrument necessary to correctly play the musical instrument;

direct the user to place the one or more body parts to correspond to the determined placement and play a note on the musical instrument;

determine, via the audio device, the note played by the user and a corresponding location on the musical instrument, wherein the corresponding location is a portion of the musical instrument that generates the note;

determine a difference between the corresponding location and a target location, wherein the target location represents at least a portion of a positioning necessary for playing the musical instrument;

generate one or more non-visual directions based on the difference; and provide the one or more non-visual directions to the user, wherein the one or more non-visual directions direct the user to adjust the placement of the one or more body parts to correspond to the target location such that the user is oriented with the musical instrument prior to playing music on the musical instrument.

20. The vision assist device of claim 19, further comprising a user interface that allows the vision impaired user to interact with the vision assist device, wherein the one or more programming instructions that, when executed, cause the processing device to provide the one or more non-visual directions to the user further cause the processing device to provide the one or more non-visual directions via the user interface.

* * * * *